US012187440B2

(12) United States Patent
Thomson et al.

(10) Patent No.: US 12,187,440 B2
(45) Date of Patent: Jan. 7, 2025

(54) AIR CURTAIN SYSTEMS AND METHODS FOR INTERNAL CABINS OF VEHICLES

(71) Applicant: THE BOEING COMPANY, Chicago, IL (US)

(72) Inventors: Frank Harrold Thomson, Stanwood, WA (US); Brian Patrick Berryessa, Seattle, WA (US); Trevor Milton Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 521 days.

(21) Appl. No.: 17/352,537

(22) Filed: Jun. 21, 2021

(65) Prior Publication Data
US 2022/0001993 A1  Jan. 6, 2022

Related U.S. Application Data

(60) Provisional application No. 63/047,284, filed on Jul. 2, 2020.

(51) Int. Cl.
*B64D 13/00* (2006.01)
*B60Q 3/44* (2017.01)
*B64D 11/06* (2006.01)

(52) U.S. Cl.
CPC ............... *B64D 13/00* (2013.01); *B60Q 3/44* (2017.02); *B64D 11/06* (2013.01)

(58) Field of Classification Search
CPC .... B64D 13/00; B64D 11/06; B64D 11/0606; B60Q 3/44; F24F 9/00
USPC ........................................................ 454/188
See application file for complete search history.

(56) References Cited

U.S. PATENT DOCUMENTS

| 4,742,760 | A | 5/1988 | Horstman |
| 5,765,635 | A | 6/1998 | Rhee |
| 11,859,864 | B1* | 1/2024 | Nygaard ................. F24F 8/108 |
| 2014/0179212 | A1 | 6/2014 | Space |
| 2014/0363333 | A1 | 12/2014 | Carr |
| 2016/0325839 | A1 | 11/2016 | Wang |
| 2019/0077215 | A1 | 3/2019 | Baek |
| 2019/0105458 | A1* | 4/2019 | Hammes ................. A61L 9/122 |
| 2022/0054699 | A1* | 2/2022 | Nakama ................. F24F 7/003 |

FOREIGN PATENT DOCUMENTS

| GB | 2579547 | | 7/2020 | |
| GB | 2579547 A | * | 7/2020 | ......... B60H 1/00357 |
| JP | 6 669845 | | 3/2020 | |
| KR | 101 480 442 | | 1/2015 | |
| WO | WO-2020016587 A1 | * | 1/2020 | ......... B60H 1/00028 |

OTHER PUBLICATIONS

Extended European Search Report for EP 21183440.3-1010, dated Nov. 26, 2021.

* cited by examiner

*Primary Examiner* — Allen R. B. Schult
(74) *Attorney, Agent, or Firm* — Joseph M. Butscher; The Small Patent Law Group LLC

(57) ABSTRACT

A vehicle includes an internal cabin, a first group of seats within a first row within the internal cabin, a second group of seats within a second row within the internal cabin, and an air curtain system within the internal cabin. The air curtain system is configured to provide one or more air curtains between one or both of (a) the first row and the second row or (b) adjacent seats of one or both of the first group or the second group.

23 Claims, 5 Drawing Sheets

AIR CURTAIN SYSTEMS AND METHODS FOR INTERNAL CABINS OF VEHICLES

CROSS-REFERENCE TO RELATED APPLICATION

This application claims priority to U.S. Patent Application No. 63/047,284 filed Jul. 2, 2020, the entire disclosure of which is incorporated herein by reference.

FIELD OF THE DISCLOSURE

Embodiments of the present disclosure generally relate to air curtain systems and methods, such as may be used within internal cabins of vehicles.

BACKGROUND OF THE DISCLOSURE

Vehicles such as commercial aircraft are used to transport passengers between various locations. Many commercial vehicles such as aircraft have HEPA filters in the air conditioning system that are able to entrap microbes and pathogens. The HEPA filters receive and clean air exiting the cabin or about to enter the cabin. HEPA filters and frequent cleaning of the cabin between flights are some methods to ensure the health of the passengers and crew onboard the aircraft. Further, certain passengers may prefer to wear masks within an internal cabin of a vehicle in order to reduce the risk of spreading pathogens.

SUMMARY OF THE DISCLOSURE

A need exists for a system and a method for preventing, minimizing, or otherwise reducing the spread of pathogens between passengers onboard a vehicle during a trip, such as between passengers in an internal cabin of an aircraft during a flight, without risking harm to the passengers.

With that need in mind, certain embodiments of the present disclosure provide a vehicle including an internal cabin, a first group of seats within a first row within the internal cabin, a second group of seats within a second row within the internal cabin, wherein the first row is adjacent the second row, and an air curtain system within the internal cabin. The air curtain system is configured to provide one or more air curtains between one or both of (a) the first row and the second row or (b) adjacent seats of one or both of the first group or the second group.

In at least one embodiment, the air curtain system includes one or more outflow vents that output the one or more air curtains. The one or more outflow vents may be disposed above the seats. Optionally, the one or more outflow vents may be disposed within the seats.

In at least one embodiment, the air curtain system further includes an airflow generator that generates airflow that is received by the one or more outflow vents. The airflow generator may be contained within one or more of the seats.

In at least one embodiment, the air curtain system further includes one or more return vents that receive the one or more air curtains. The one or more return vents may be disposed below the seats. Optionally, the one or more return vents may be disposed within the seats.

In at least one embodiment, the air curtain system further includes a control unit that is configured to control positions of the one or more outflow vents in response to positions of the seats.

In at least one embodiment, the air curtain system further includes one or more light emitting devices that are configured to emit light along at least a portion of the one or more curtains to indicate presence of the one or more air curtains.

Certain embodiments of the present disclosure provide an air curtain method for a vehicle having an internal cabin, a first group of seats within a first row within the internal cabin, and a second group of seats within a second row within the internal cabin, wherein the first row is adjacent the second row. The air curtain method includes providing, by an air curtain system within the internal cabin, one or more air curtains between one or both of (a) the first row and the second row or (b) adjacent seats of one or both of the first group or the second group.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an air curtain system and method within an internal cabin of a vehicle. The air curtain system is configured to generate an air curtain between seats and/or rows within the internal cabin to provide a more controlled airspace.

Figure 1:
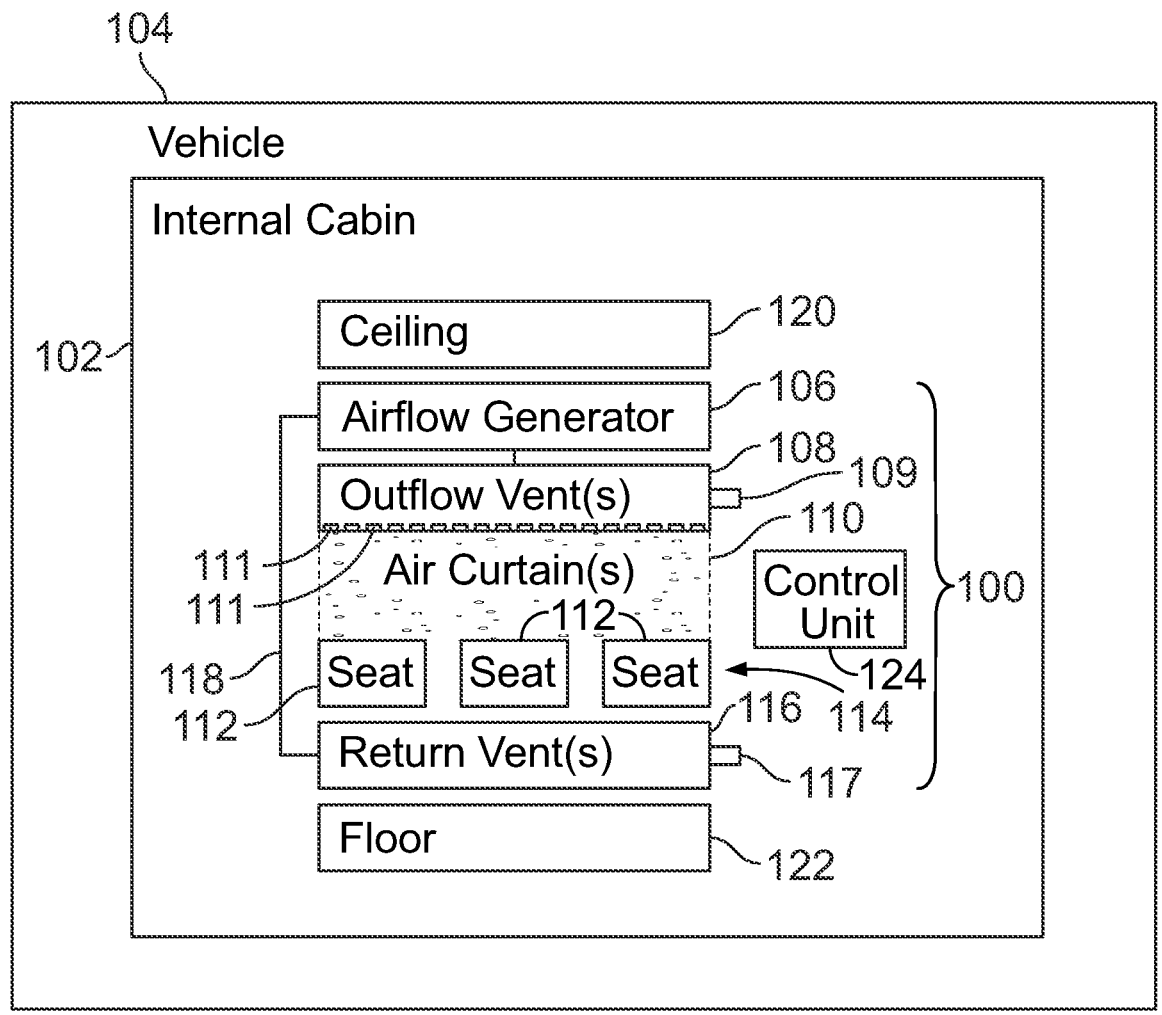
FIG. 1 illustrates a schematic block diagram of an air curtain system within an internal cabin of a vehicle, according to an embodiment of the present disclosure.

FIG. 1 illustrates a schematic block diagram of an air curtain system 100 within an internal cabin 102 of a vehicle 104, according to an embodiment of the present disclosure. The air curtain system 100 includes an airflow generator 106 that is configured to generate airflow that is directed through one or more outflow vents 108. The outflow vents 108 include one or more nozzles, or other such outlets that are configured to direct the airflow from the airflow generator 106 as an air curtain 110 between seats 112 and/or rows 114 of seats 112. The air curtain 110 that is output through the outflow vents 108 passes between the seats 112 and/or the rows 114 and is received by one or more return vents 116 (including one or more nozzles, or other such intakes), which channel the resulting airflow back to the airflow generator 106 via one or more conduits 118, such as ducts.

The nozzles may be sized and shaped to cover a single seat 112 or a row 114 of seats 112. For example, an outflow vent 108 in the form of an elongated nozzle that extends over a group of seats 112 may be used. As another example, an outflow vent 108 having a nozzle that extends over only one seat 112 may be used.

The airflow generator 106 may include one or more of a blower, fan, vacuum generator, and/or the like. The airflow generator 106 is secured within the internal cabin 102. For example, the airflow generator 106 may be disposed above a ceiling 120, behind a wall, within a compartment, and/or the like. As another example, the airflow generator 106 may be disposed on or within one or more of the seats 112, such as above and/or behind a headrest, within a support base, and/or the like. As another example, the airflow generator 106 may be or include an air intake within one or more passenger service units (PSUs) above the seats 112. The main air supply system of the vehicle 104 may include the airflow generator 106. As another example, the airflow generator 106 may be independent of a main air supply system of the vehicle 104. For example, an airflow generator 106 may be integrated into one or more of the seats 112. As a further example, each seat 112 may include an airflow generator 106.

The airflow generator 106 may draw air from within the internal cabin 102. For example, the airflow generator 106 may draw air from an area by or surrounding a seated passenger. The airflow generator 106 may include one or more air filters that filter the airflow before the passing out of the outflow vents 108. In at least one embodiment, the airflow generator 106 may draw in air from both one or more of the PSUs and from the seated passenger area to increase air flow. In at least one embodiment, the airflow generator 106 includes a fan that draws air from one or more of the PSUs and/or the seated passenger area. As a further example, air intakes proximate to and/or from the seated passenger area may be located to increase the space of the protected area and/or locate the air curtain 110 as desired.

The outflow vents 108 may be secured in the ceiling 120 above the seats 112. As another example, the outflow vents 108 may be disposed on one or more of the seats 112. For example, one or more of the outflow vents 108 may be disposed on or proximate to portions of a head rest, such as lateral portions of the head rest. As another example, the outflow vents 108 may be within one or more PSUs.

The outflow vents 108 are sized and shaped to provide a desired size and/or shape of the air curtain 110. In at least one embodiment, the outflow vents 108 may include a gasper having one or more slits that are configured to shape the air curtain 110.

The return vents 116 may be sized and shaped the same or similar as the outflow vents 116 and are configured to receive and catch the air curtain 110 output by the outflow vents 108. The return vents 116 may be disposed below the seats 112, such as on and/or within a floor 122 that supports the seats 112. As another example, the returns vents 116 may be on lower portions of the seats 112, such as underneath a seat pan. The conduit(s) 118 may be routed underneath the floor 122, behind walls, and to the airflow generator 106. The return vents 116 facilitate returning the airflow of the air curtain 110 back to the airflow generator 106. Alternatively, the air curtain system 100 may not include the return vents 116.

The outflow vents 108 (such as air outlets) and the returns vents 116 (such as air intakes) may be located relative to the seats 112 to adjust in response to the seats being upright or reclined. For example, the outflow vents 108 and return vents 116 may be coupled to one or more actuators 109 and 117, respectively, (such as motors) that adjust the positions (such as angled positions) of the outflow vents 108 and the return vents 116 in response to reclined positions of the seats 112. For example, the actuators 109 and 117 may be configured to adjust angular positions of the outflow vents 108 and/or the return vents 116 themselves, or portions thereof, such as louvers, slats, or the like. The positions of outflow vents 108 and the return vents 116 may be manually adjusted or automatically adjusted, such as through a control unit 124, such as within the internal cabin 102.

For example, in at least one embodiment, the control unit 124 is in communication with the actuators 109 and 117 and/or position sensors of the seats 112 via one or more wired or wireless connections. The control unit 124 detects positions of the seats 112 via the position sensors and adjusts the positions of the outflow vents 108 and the returns vents 116, via the actuators 109 and 117, in response to the detected positions of the seats 112. The control unit 124 may be further in communication with the airflow generator 106, such as through one or more wired or wireless connections. The control unit 124 may control the airflow generator 106 and the positions of the outflow vents 108 and the return vents 116 based on the positions of the seats 112 to ensure that the air curtain 110 is disposed between the seats 112 and/or the rows 114.

In at least one other embodiment, the outflow vents 109 and/or the return vents 117 are not moveable, but instead may be fixed in position. In order to provide effective air curtains 110 over a widest range, the outflow vents 109 may be positioned above and behind a position of a seat 112 in a further reclined position, while the return vents 116 are at a forward position in relation to the outflow vents 108. In this manner, the resulting air curtain 110 may be directed at an angle from the outflow vents 108 to the return vents 116.

The air curtain 110 generated between the seats 112 and/or the rows 114 of seats 112 prevents transmission of pathogens between passengers within the internal cabin. The air curtain 110 provides a barrier of air that prevents or otherwise reduces air passage between the seats 112 and/or the rows 114. In at least one embodiment, the air curtain 110 is generated between the rows 114 so that forward and aft air flow therebetween is reduced.

In at least one embodiment, an air curtain 110 is generated between adjacent rows 114, as well as between seats 112 within the rows 114. For example, a first air curtain 110 between the rows 114 is perpendicular to a second air curtain 110 between adjacent seats 112. In this manner, an individualized air curtain barrier or bubble may be disposed around each passenger within a seat 112.

In at least one embodiment, the air curtain 110 is directed from above the seats 112 to below the seats 112. For example, the air curtain 110 moves from above the seats to below the seats 112. Alternatively, the air curtain 110 may travel from below the seats 112 to above the seats 112. As an example, the outflow vents 108 can be arranged along the back and/or top of each seat 112 (or row 114 of seats 112)

and direct the air curtain 110 upwardly to the returns vents 116, which may be in the ceiling 120.

In at least one embodiment, the air curtain(s) 110 may be continuously generated. As another example, the air curtain(s) 110 may be selectively activated and deactivated manually via a user interface in communication with the control unit 124, and/or automatically via the control unit 124.

In at least one embodiment, the air curtain system 100 includes a visual indication of the presence of the air curtain 110. For example, one or more light emitting devices 111 (such as light emitting diodes (LEDs), incandescent colored or filtered bulbs, and/or the like) may be embedded in or proximate to (such as within one to two inches of) the outflow vents 108 and/or the return vents 116 so that a visual light path curtain runs concurrently with the air curtain 110 to show passengers the presence of the air curtain 110. Alternatively, a mist or other particles may be included within the air curtain 110 to indicate the presence of the air curtain 110. The light emitting devices 111 may be configured to emit directional light along the air curtain 110 to indicate to passengers that they are being protected by the air curtains. In at least one embodiment, the light emitting devices 111 may emit colored light in one or more columns or sheets along the air curtain 110 to provide a readily discernable indication that the air curtain 110 is present. The light emitting devices 111 may only be activated when the air curtain 110 is provided. For example, the control unit 124 may activate the light emitting devices 111 only when the air curtain 110 is provided. The light emitting devices 111 may continually emit the light when the air curtain 110 is provided, or at intervals (such as every five to ten minutes). The light emitting devices 111 may include projectors or masking structures that assist in focusing the light along the air curtain 110.

As described herein, embodiments of the present disclosure provide the vehicle 104 having the internal cabin 102. Seats 112 are arranged in rows 114 within the internal cabin 102. The outflow vent(s) 108 output one or more air curtains 110 between one or both of adjacent seats 112 and/or adjacent rows 114 of seats 112. One or more air curtains 110 may be also be generated between seats 112 separated by an aisle within the internal cabin 102.

As noted, air curtains 110 may be provided between adjacent rows 114 and/or adjacent seats 112 to provide barriers of air between the rows 114 and/or the seats 112. In at least one embodiment, air curtains 110 may be used to provide groups of seats 112 that are separated by barriers defined by multiple air curtains 110. For example, certain sections of the internal cabin 102 may be separated from one another by air curtains 110. In particular, multiple rows 114 of seats 112 may be bounded by air curtains 110, without additional air curtains 110 within the bounded area.

An air system within the vehicle 104 may be operated to recirculate air within the various areas separated by air curtains 110 at predetermined times. For example, a first group of seats 112 (whether in one or more rows 114) may be bounded by air curtains 110. Air may be recirculated within such bounded areas at predetermined times, such as every two to five minutes.

The vehicle 104 includes the internal cabin 102. A first group of seats 112 are within a first row 114 within the internal cabin 102. A second group of seats 112 are within a second row 114 within the internal cabin 102. The first row is adjacent the second row (that is, the first row immediately neighbors the second row). The air curtain system 100 is within the internal cabin 102, and is configured to provide one or more air curtains 110 between one or both of (a) the first row and the second row (that is, between adjacent rows) or (b) adjacent seats of one or both of the first group or the second group (that is, between adjacent seats).

Certain embodiments of the present disclosure provide an air curtain method for the vehicle 104 having the internal cabin 102, a first group of seats 112 within a first row 114 within the internal cabin 102, and a second group of seats 112 within a second row 114 within the internal cabin 102. The first row is adjacent the second row. The air curtain method includes providing, by the air curtain system 100 within the internal cabin 102, one or more air curtains 110 between one or both of (a) the first row and the second row or (b) adjacent seats 112 of one or both of the first group or the second group.

In at least one embodiment, said providing includes outputting, by the one or more outflow vents 108, the one or more air curtains 110. The method may further include disposing the one or more outflow vents 108 above the seats 112. Optionally, the method may include disposing the one or more outflow vents 108 within the seats 112.

In at least one embodiment, said providing further includes generating, by the airflow generator 106, airflow that is received by the one or more outflow vents 108. The method may also include containing the airflow generator 106 within one or more of the seats 112.

In at least one embodiment, the method also includes receiving, by the one or more return vents 116 of the air curtain system 100, the one or more air curtains 110. The method may further include disposing the one or more return vents 116 below the seats 112. Optionally, the method may further include disposing the one or more return vents 116 within the seats 112.

In at least one embodiment, the method may also include controlling, by the control unit 124, positions of the one or more outflow vents 108 in response to positions of the seats 112.

In at least one embodiment, the method may also include emitting, by the one or more light emitting devices 111, light along at least a portion of the one or more air curtains 110 to indicate presence of the one or more air curtains 110.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 124 may be or include one or more processors that are configured to control operation of the airflow generator 106 and/or the actuators 109 and 117, as described herein.

The control unit 124 is configured to execute a set of instructions that are stored in one or more data storage units or elements (such as one or more memories), in order to process data. For example, the control unit 124 may include or be coupled to one or more memories. The data storage units may also store data or other information as desired or needed. The data storage units may be in the form of an information source or a physical memory element within a processing machine.

The set of instructions may include various commands that instruct the control unit 124 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 124. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 124 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
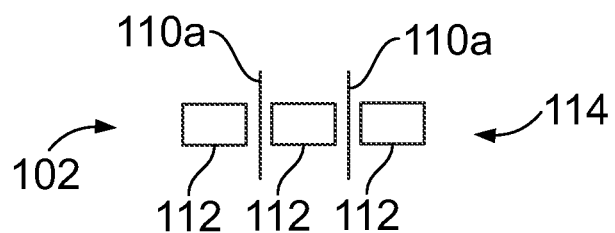
FIG. 2 illustrates a top plan view of air curtains between adjacent seats within an internal cabin, according to an embodiment of the present disclosure.

FIG. 2 illustrates a top plan view of air curtains 110a between adjacent seats 112 within the internal cabin 102, according to an embodiment of the present disclosure. The seats 112 are in a group within the row 114. Referring to FIGS. 1 and 2, in at least one embodiment, one or more of the outflow vents 108 are configured to output an air curtain 110a between adjacent seats 112.

Figure 3:
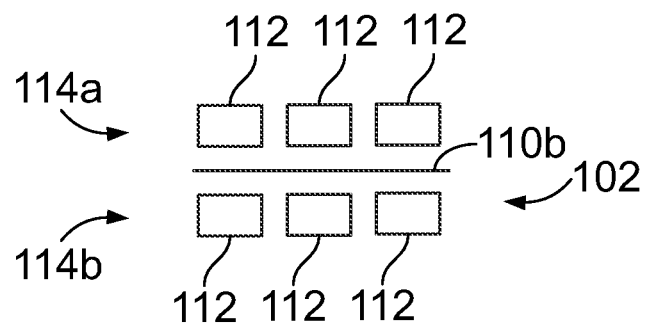
FIG. 3 illustrates a top plan view of an air curtain between adjacent rows within an internal cabin, according to an embodiment of the present disclosure.

FIG. 3 illustrates a top plan view of an air curtain 110b between adjacent rows 114a and 114b within the internal cabin 102, according to an embodiment of the present disclosure. The seats 112 within the first row 114a are in a first group, and the seats 112 within the second rows 114b are in a second group. The first row 114a is adjacent the second row 114b. Referring to FIGS. 1 and 3, in at least one embodiment, one or more of the outflow vents 108 are configured to output the air curtain 110b between the adjacent rows 114a and 114b.

Figure 4:
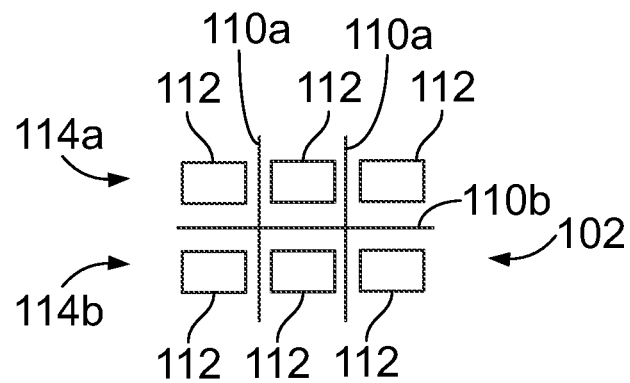
FIG. 4 illustrates a top plan view of first air curtains between adjacent seats within rows and a second air curtain between adjacent rows within an internal cabin, according to an embodiment of the present disclosure.

FIG. 4 illustrates a top plan view of first air curtains 110a between adjacent seats 112 within rows 114a and 114b and a second air curtain 110b between adjacent rows 114a and 114b within the internal cabin 102, according to an embodiment of the present disclosure. As shown, the first air curtains 110a may be perpendicular to the second air curtain 110b. Referring to FIGS. 1 and 4, in at least one embodiment, one or more of the outflow vents 108 are configured to output the air curtains 110a between adjacent seats 112, and the air curtain 110b between the adjacent rows 114a and 114b.

Figure 5:
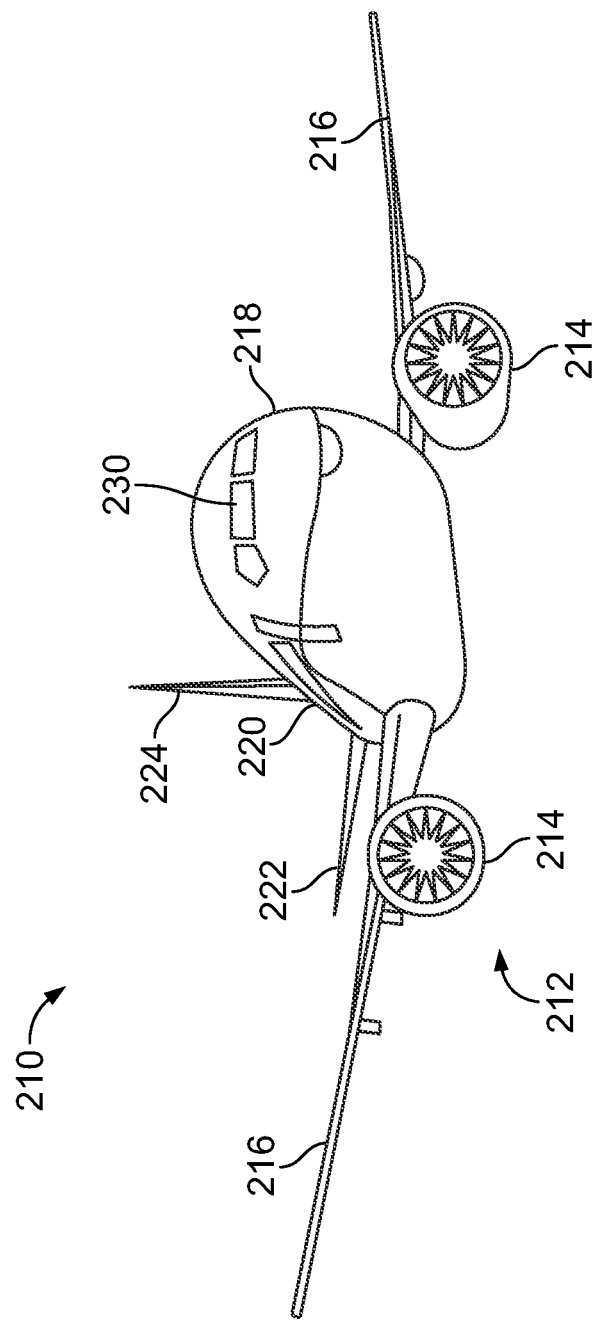
FIG. 5 illustrates a perspective front view of an aircraft, according to an embodiment of the present disclosure.

FIG. 5 illustrates a perspective front view of an aircraft 210, according to an embodiment of the present disclosure. The aircraft 210 is an example of the vehicle 104 shown in FIG. 1. The aircraft 210 includes a propulsion system 212 that includes engines 214, for example. Optionally, the propulsion system 212 may include more engines 14 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230 (such as the internal cabin 102 shown in FIG. 1), which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings.

Figure 6A:
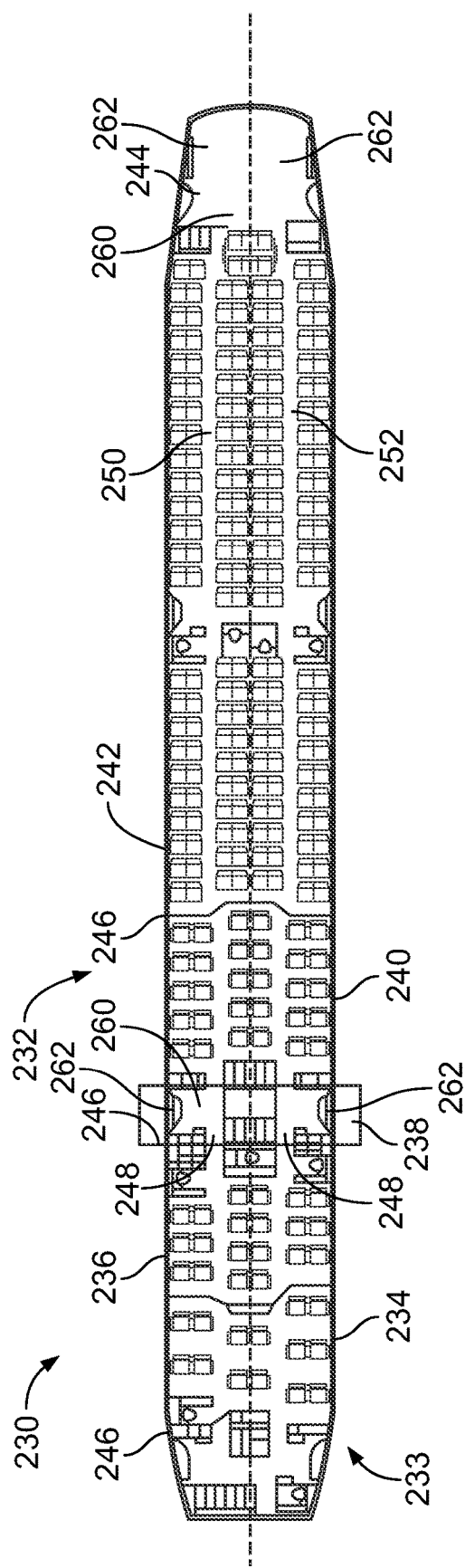
FIG. 6A illustrates a top plan view of an internal cabin of an aircraft, according to an embodiment of the present disclosure.

FIG. 6A illustrates a top plan view of an internal cabin 230 of an aircraft, according to an embodiment of the present disclosure. The internal cabin 230 may be within the fuselage 232 of the aircraft, such as the fuselage 218 of FIG. 5. For example, one or more fuselage walls may define the internal cabin 230. The internal cabin 230 includes multiple sections, including a front section 233, a first class section 234, a business class section 236, a front galley station 238, an expanded economy or coach section 240, a standard economy of coach section 242, and an aft section 244, which may include multiple lavatories and galley stations. It is to be understood that the internal cabin 230 may include more or less sections than shown. For example, the internal cabin 230 may not include a first class section, and may include more or less galley stations than shown. Each of the sections may be separated by a cabin transition area 246, which may include class divider assemblies between aisles 248.

As shown in FIG. 6A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

The aisles 248, 250, and 252 extend to egress paths or door passageways 260. Exit doors 262 are located at ends of the egress paths 260. The egress paths 260 may be perpendicular to the aisles 248, 250, and 252. The internal cabin 230 may include more egress paths 260 at different locations than shown. The air curtain system 100 shown and described with respect to FIGS. 1-4 may be used within the internal cabin 230.

Figure 6B:
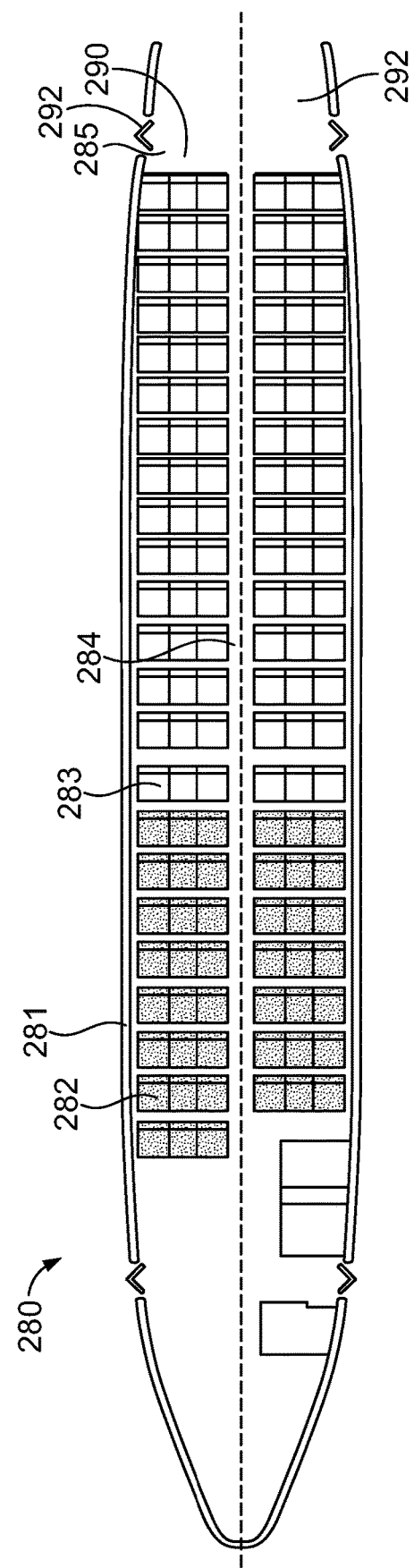
FIG. 6B illustrates a top plan view of an internal cabin of an aircraft, according to an embodiment of the present disclosure.

FIG. 6B illustrates a top plan view of an internal cabin 280 of an aircraft, according to an embodiment of the present disclosure. The internal cabin 280 is an example of the internal cabin 230 shown in FIG. 5. The internal cabin 280 may be within a fuselage 281 of the aircraft. For example, one or more fuselage walls may define the internal cabin 280. The internal cabin 280 includes multiple sections, including a main cabin 282 having passenger seats 283, and an aft section 285 behind the main cabin 282. It is to be understood that the internal cabin 280 may include more or less sections than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

The aisle 284 extends to an egress path or door passageway 290. Exit doors 292 are located at ends of the egress path 290. The egress path 290 may be perpendicular to the aisle 284. The internal cabin 280 may include more egress paths than shown. The air curtain system 100 shown and described with respect to FIGS. 1-4 may be used within the internal cabin 280.

Figure 7:
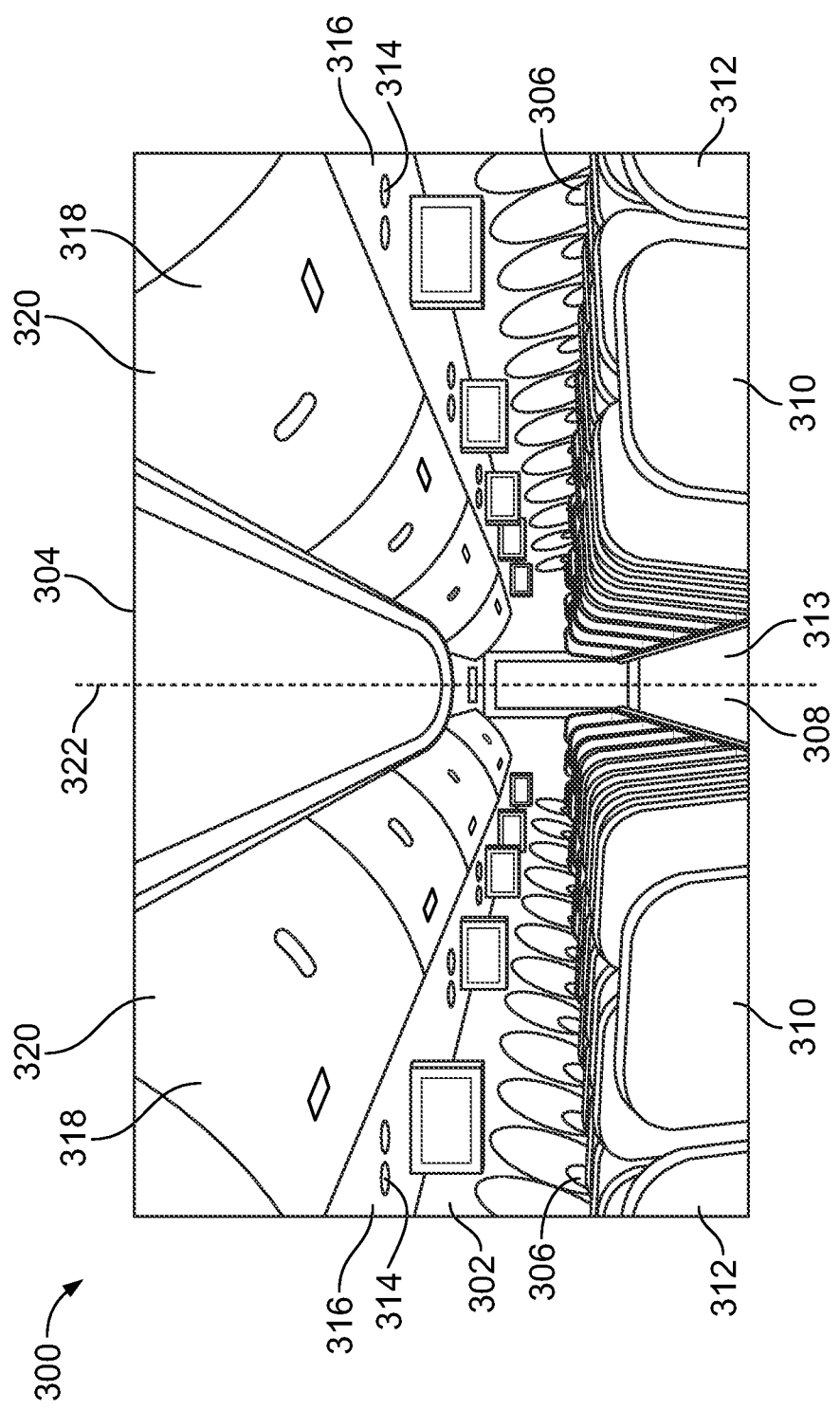
FIG. 7 illustrates a perspective interior view of an internal cabin of an aircraft, according to an embodiment of the present disclosure.

FIG. 7 illustrates a perspective interior view of an internal cabin 300 of an aircraft, according to an embodiment of the present disclosure. The internal cabin 300 is an example of the internal cabin 102 shown in FIG. 1. The internal cabin 300 includes outboard walls 302 connected to a ceiling 304. Windows 306 may be formed within the outboard walls 302. A floor 308 supports rows of seats 310. As shown in FIG. 7, a row 312 may include two seats 310 on either side of an aisle 313. However, the row 312 may include more or less seats 310 than shown. Additionally, the internal cabin 300 may include more aisles than shown.

PSUs 314 are secured between an outboard wall 302 and the ceiling 304 on either side of the aisle 313. The PSUs 314 extend between a front end and rear end of the internal cabin 300. For example, a PSU 314 may be positioned over each seat 310 within a row 312. Each PSU 314 may include a housing 316 that generally contains vents, reading lights, an oxygen bag drop panel, an attendant request button, and other such controls over each seat 310 (or groups of seats) within a row 312.

Overhead stowage bin assemblies 318 are secured to the ceiling 304 and/or the outboard wall 302 above and inboard from the PSU 314 on either side of the aisle 313. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 300 as compared to another component. The term "inboard" means a position that is closer to the central longitudinal plane 322 of the internal cabin 300 as compared to another component. For example, a lower surface of a PSU 314 may be outboard in relation to a stowage bin assembly 318.

As described herein, the air curtain systems and methods are configured to provide air curtains between adjacent rows or seats and/or adjacent seats within the rows, thereby reducing the spread of pathogens between passengers onboard a vehicle during a trip.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, value modifiers such as "about," "substantially," and "approximately" inserted before a numerical value indicate that the value can represent other values within a designated threshold range above and/or below the specified value, such as values within 5%, 10%, or 15% of the specified value.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
   an internal cabin;
   a first group of seats within a first row within the internal cabin;
   a second group of seats within a second row within the internal cabin, wherein the first row is adjacent the second row; and an air curtain system within the internal cabin, wherein the air curtain system is configured to provide one or more air curtains between one or both of (a) the first row and the second row or (b) adjacent seats of one or both of the first group or the second group, wherein the air curtain system comprises:
  one or more outflow vents that output the one or more air curtains;
  one or more actuators operatively coupled to the one or more outflow vents, wherein the one or more actuators are configured to adjust positions of the one or more outflow vents; and
  a control unit including one or more processors configured to operate the one or more actuators to adjust the positions of the one or more outflow vents based on positions of the seats.

2. The vehicle of claim 1, wherein the one or more outflow vents are disposed above the seats.

3. The vehicle of claim 1, wherein the one or more outflow vents are disposed within the seats.

4. The vehicle of claim 1, wherein the air curtain system further comprises an airflow generator that generates airflow that is received by the one or more outflow vents.

5. The vehicle of claim 4, wherein the airflow generator is contained within one or more of the seats.

6. The vehicle of claim 1, wherein the air curtain system further comprises one or more return vents that receive the one or more air curtains, wherein the one or more actuators are further coupled to the one or more return vents, wherein the one or more actuators are configured to adjust positions of the one or more return vents, and wherein the control unit including the one or more processors is further configured to operate the one or more actuators to adjust the positions of the one or more return vents based on the positions of the seats.

7. The vehicle of claim 6, wherein the one or more return vents are disposed below the seats.

8. The vehicle of claim 6, wherein the one or more return vents are disposed within the seats.

9. The vehicle of claim 1, wherein the air curtain system further comprises one or more light emitting devices that are configured to emit light along at least a portion of the one or more air curtains to indicate presence of the one or more air curtains.

10. The vehicle of claim 9, wherein the one or more light emitting devices are embedded in the one or more outflow vents.

11. The vehicle of claim 9, wherein the one or more light emitting devices are activated only when the one or more air curtains are provided.

12. The vehicle of claim 9, wherein the one or more light emitting devices are configured to emit colored light in one or more columns or sheets along the one or more air curtains to provide a readily discernable indication that the one or more air curtains are present.

13. The vehicle of claim 9, wherein the control unit is further configured to automatically control the one or more light emitting devices to emit the light at intervals.

14. An air curtain method for a vehicle having an internal cabin, a first group of seats within a first row within the internal cabin, and a second group of seats within a second row within the internal cabin, wherein the first row is adjacent the second row, the air curtain method comprising:
  providing, by an air curtain system within the internal cabin, one or more air curtains between one or both of (a) the first row and the second row or (b) adjacent seats of one or both of the first group or the second group, wherein said providing comprises outputting, by one or more outflow vents, the one or more air curtains; and
  controlling, by a control unit including one or more processors, one or more actuators coupled to the one more outflow vents to adjust positions of the one or more outflow vents based on positions of the seats.

15. The air curtain method of claim 14, further comprising disposing the one or more outflow vents above the seats.

16. The air curtain method of claim 14, further comprising disposing the one or more outflow vents within the seats.

17. The air curtain method of claim 14, wherein said providing further comprises generating, by an airflow generator, airflow that is received by the one or more outflow vents.

18. The air curtain method of claim 17, further comprising containing the airflow generator within one or more of the seats.

19. The air curtain method of claim 14, further comprising receiving, by one or more return vents of the air curtain system, the one or more air curtains, wherein said controlling further comprises controlling the one or more actuators coupled to the one more return vents to adjust positions of the one or more return vents based on the positions of the seats.

20. The air curtain method of claim 19, further comprising disposing the one or more return vents below the seats.

21. The air curtain method of claim 19, further comprising disposing the one or more return vents within the seats.

22. The air curtain method of claim 14, further comprising emitting, by one or more light emitting devices, light along at least a portion of the one or more air curtains to indicate presence of the one or more air curtains.

23. A vehicle comprising:
  an internal cabin;
  a first group of seats within a first row within the internal cabin;
  a second group of seats within a second row within the internal cabin, wherein the first row is adjacent the second row; and
  an air curtain system within the internal cabin, wherein the air curtain system is configured to provide one or more air curtains between one or both of (a) the first row and the second row or (b) adjacent seats of one or both of the first group or the second group, wherein the air curtain system comprises:
    one or more outflow vents that output the one or more air curtains;
    an airflow generator that generates airflow that is received by the one or more outflow vents;
    one or more return vents that receive the one or more air curtains;
    one or more actuators operatively coupled to the one or more outflow vents and the one or more return vents, wherein the one or more actuators are configured to adjust positions of the one or more outflow vents and the one or more return vents;
    a control unit including one or more processors configured to operate the one or more actuators to adjust positions of the one or more outflow vents and the one or more return vents based on positions of the seats; and
    one or more light emitting devices that are configured to emit light along at least a portion of the one or more air curtains to indicate presence of the one or more air curtains.

* * * * *